April 18, 1939.  H. GEFFCKEN ET AL  2,155,224
ILLUMINATION SWITCH
Filed Jan. 18, 1935   2 Sheets-Sheet 1
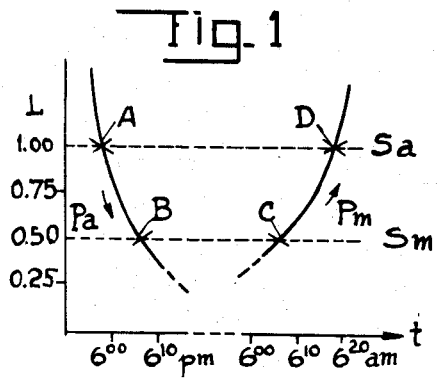
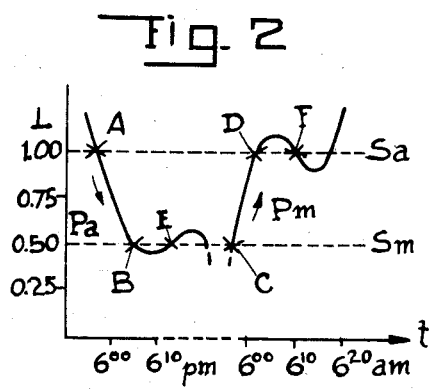
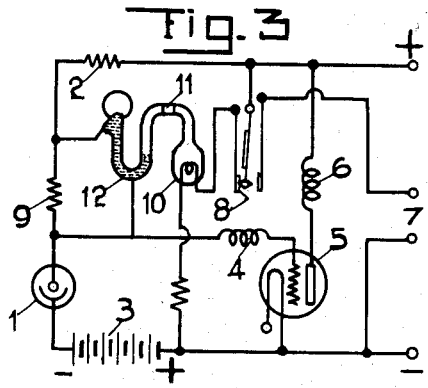
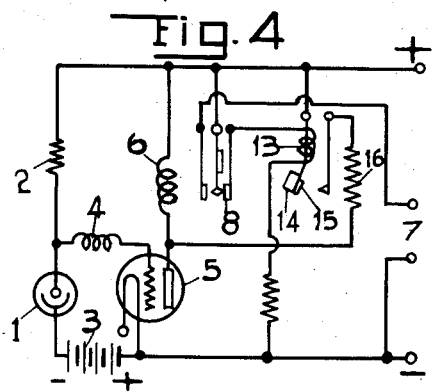
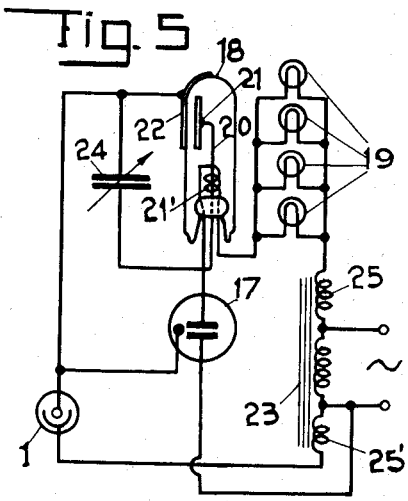
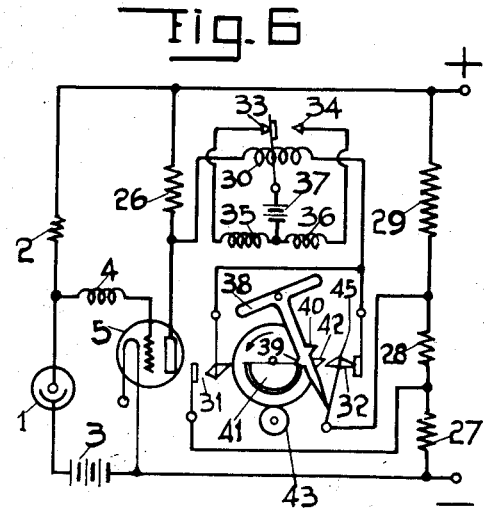
INVENTORS
HEINRICH GEFFCKEN AND
HANS RICHTER
BY
ATTORNEY

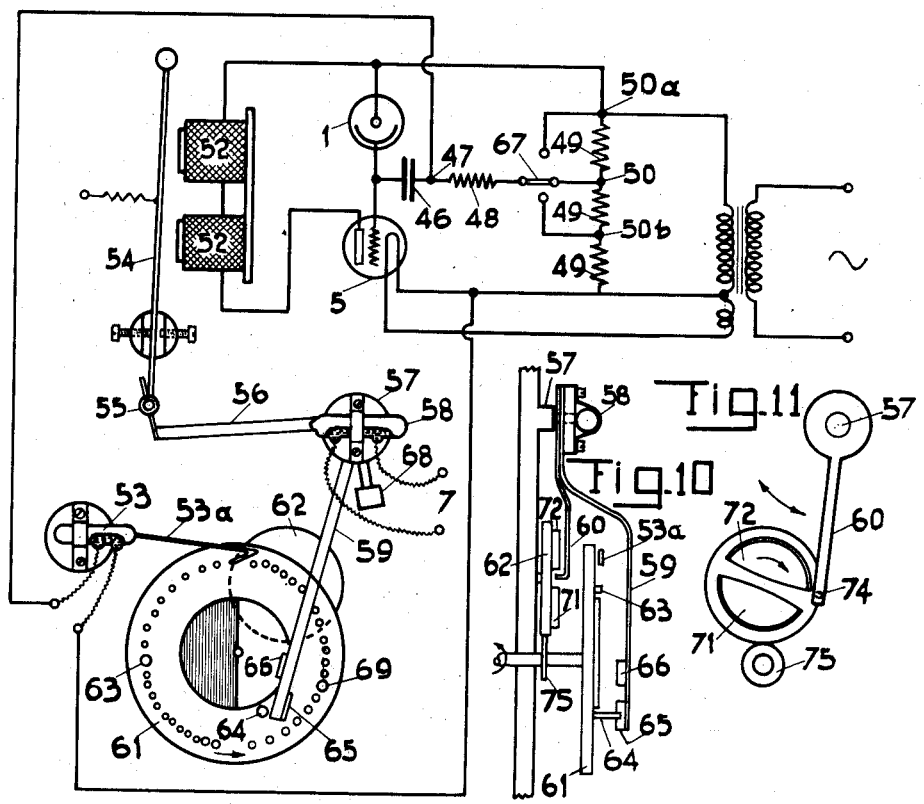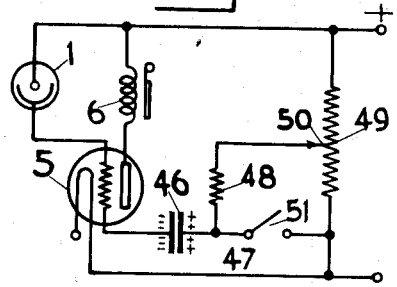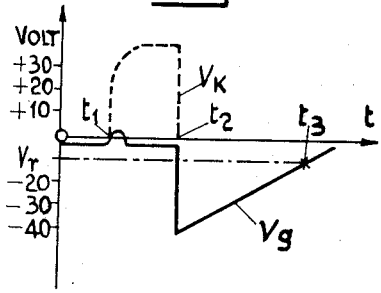

Patented Apr. 18, 1939

2,155,224

UNITED STATES PATENT OFFICE 2,155,224

ILLUMINATION SWITCH

Heinrich Geffcken and Hans Richter, Leipzig, Germany, assignors to Radio Patents Corporation, New York, N. Y., a corporation of New York Application January 18, 1935, Serial No. 2,318
In Germany January 20, 1934

8 Claims. (Cl. 250—41.5)

The present invention relates to improvements in illumination switches and methods of operating same, and more particularly to means for automatically turning on and off artificial illumination, such as signs, flood-lights, street lights, etc., according to varying daylight conditions.

The invention has for its main object to provide an automatic illumination switch system especially adapted for connecting and disconnecting street lights at night and in the morning, respectively, which insures increased reliability and economy in operation, as compared to similar devices heretofore known in the art.

The known type of dawn and twilight switches for automatic control of artificial illumination usually comprise an electro-optical apparatus including a photoelectric device operating a relay or switch mechanism adapted to turn on artificial illumination, such as street lights, etc., at night as soon as the daylight illumination has decreased below a predetermined limit value and to disconnect the artificial illumination when the increasing daylight has reached a predetermined limit.

In devices of this type known in the prior art, it was found necessary and advantageous to maintain the illumination to turn off the artificial lights substantially higher than the illumination to turn on in order to prevent annoyingly frequent and undesired operations during the transition periods due to transient daylight fluctuations and other interference. Usually the sensitivity for the turn-on is substantially higher than the sensitivity for the turn-off, resulting in a connection of the artificial illumination late at night and a turn-off late in the morning.

As is understood, such a system has great disadvantages from both a practical and economical standpoint in that it is desirable to turn the lights on early in the evening when they are mostly needed and to effect the turn-off early in the morning.

Accordingly, it is a further object of the invention to provide a novel system and method of operation for automatically controlling artificial illumination by which the illumination is turned on early at night and turned off early in the morning while maintaining at the same time a sufficient differential between the illumination to turn on and the illumination to turn off to allow for fluctuations during the transition periods; that is, during the twilight and dawn periods, thus preventing frequent and undesired disturbing connections and disconnections.

With the above objects in view, the present invention principally involves an illumination switching system controlled according to daylight conditions and provided with means for varying the sensitivity of response of the system by the provision of a delay device set in motion with each operation of the illumination switch and serving to change the sensitivity of response to a new value after each operation. By an arrangement of this type it is possible, contrary to devices heretofore known in the art, to change over the response sensitivity at night from a lower to a higher value and in the morning from a higher to a lower value, thus substantially overcoming the disadvantages inherent in the prior arrangements as pointed out above.

The invention has further aspects and objects in view which will appear hereafter in the detailed description thereof taken in connection with the accompanying drawings in which we have shown several embodiments of a switching system according to the invention.

Figures 1 and 2 represent illustrative curves showing the varying conditions in the change in daylight illumination during the daylight and dawn periods on different days.

Figure 3 illustrates a circuit arrangement according to the invention utilizing a gas pressure thermo-switch as a time delay device.

Figures 4 and 5 show a modification of an inventive circuit employing bi-metallic elements to secure the required time delay action.

Figure 6 illustrates a further embodiment of the invention using a mechanical delay mechanism.

Figure 7 shows a principal circuit of a preferred control circuit suited for use with the invention.

Figure 8 shows explanatory operating curves of the circuit according to Figure 7.

Figure 9 illustrates schematically an improved circuit arrangement of a time switch system according to the invention.

Figures 10 and 11 are detailed partial views of the mechanism shown by Figure 9.

Similar reference characters denote similar elements throughout the different views of the drawings.

Referring more particularly to the diagram shown by Figure 1 in which the abscissae represent the time $t$ and the ordinates L the intensity of the daylight illumination for a bright day, it is seen that the intensity of the daylight at night gradually decreases approximately according to an exponential curve as shown. It first passes through the critical value $S_a$ (illumination to turn on) at which it is desired to turn on the artificial illumination at night and as shown at A. Afterwards the illumination passes the lower critical or threshold value $S_m$ as shown at B at which the artificial illumination is to be turned off in the morning (illumination to turn off). In the morning the daylight illumination changes in the reverse manner by first passing the threshold $S_m$ at C and consecutively the threshold $S_a$ at D.

In accordance with the invention, the automatic lighting switch system functions in that the artificial illumination is turned on at A and again turned off at C without causing disturbances after passing through B and D. In the prior arrangements the turn-on takes place at B and the turn off at D with the attendant drawbacks and disadvantages as pointed out above.

Such disturbances would, for instance, occur if the change-over to the sensitivity corresponding to $S_m$ would be effected simultaneously with the turn-on of the illumination (after passing point A) or if the change-over to the sensitivity value corresponding to $S_a$ would take place simultaneously with the turning-off of the lamps (after passing point C). In this latter case, annoyingly periodic switching operations and connections and disconnections of the illumination will take place within the region A—C and D—A, respectively.

One means to avoid the above mentioned disadvantage consists in making the operation dependent on the sense of change of the illumination; that is, either on the decrease at night or increase in the morning in such a manner that the artificial lights are turned on only after the daylight illumination has decreased beyond the threshold $S_a$ (direction of arrow $P_a$) and that the disconnection of the artificial lights takes place only after the daylight illumination has increased beyond the threshold $S_m$ (direction of the arrow $P_m$). A system of this type, however, still has great disadvantages in case that the transition from daylight to darkness actually is quite irregular due to shadow effects caused by clouds and after interference, as illustrated more clearly in Figure 2.

If the daylight illumination decreases according to a curve as shown in this figure (arrow $P_a$), the artificial lights are turned on at A but will again be turned off several minutes later at E in such a manner as to remain in the disconnected position throughout the night. On the other hand, the case may happen that in the morning the illumination follows a course as shown in figure (arrow $P_m$). In this case, as is understood, the artificial lamps are turned off at D to be turned on again immediately thereafter at F in such a manner that the illumination remains connected throughout the daytime.

It is one of the main advantages of the invention, as pointed out, to completely overcome the above disadvantages and difficulties inherent in automatic switching systems of the type heretofore known in the art, and to provide a new system which is simple in construction and highly reliable in operation.

The novel objects according to the invention are secured principally by the arrangement of a time delay device set in motion with each operation of the switching mechanism. The change-over from the lower to the higher sensitivity is carried out after a definite running period of the delay device. The running time of the time delay device is chosen sufficiently such as from 10 to 30 minutes in such a manner as to safely cover the entire twilight or dawn periods. According to a specially favorable embodiment of the invention, the running time of the delay device is made dependent on the duration of the dawn or twilight periods whereby the apparatus may be used with the same adjustment in high northern latitudes where the duration of dawn and twilight periods is long, as well as in the southern latitudes where the duration is comparatively short and sudden.

While in the detailed descriptions to follow we have shown a light sensitive organ operated by the daylight illumination and controlling an electric amplifying tube, it is understood that a different type of photoelectric control device and amtlifier known in the art may be provided in place of the devices as illustrated.

Referring to Figures 3 and 4, we have shown a photoelectric cell 1 connected in series with a resistance 2 and supplied from a suitable current source such as a battery, etc. indicated by the plus and minus signs in the drawings. The junction point between the photoelectric cell and its series resistance is connected to the grid of an ordinary vacuum tube 5 preferably through a small choke coil 4 in a manner well known in the art. The anode circuit of the tube 5 which is supplied from the common operating source includes a preliminary relay 6 with a secondary control or output circuit led to the terminals 7. The relay 6 may control, in a well known manner, the supply circuit of the artificial lights either directly or thru a suitable secondary relay and time delay arrangement, such as thermoswitch, etc. in a well known manner, as is well understood. The relay 6 is provided with a second contact shown at 8 serving to control the change-over from one sensitivity value to another thru a time delay relay of high inertia provided in accordance with the present invention.

The change-over from one critical response sensitivity to the other according to Figure 3 is obtained by varying the sensitivity to light variations of the photoelectric circuit. For this purpose the photoelectric circuit includes a second resistance 9 in series with the resistance 2 and the photoelectric device. The resistance 9 in the position shown (corresponding to conditions of daylight) is short-circuited by the mercury column of a gas pressure switch. The gas pressure switch consists of a gas filled incandescent lamp 10 connected with a contact manometer 12 by means of a duct containing a plug 11 consisting of gypsum or similar material.

During daylight conditions the photoelectric device is subjected to intense illumination, as a result of which the grid of the tube 5 becomes negative due to the negative biasing source such as battery shown at 3 and accordingly the armature of the relay 6 is in its repelled position, thus closing the contact 8 and the current thru the incandescent lamp 10. Thus the gas in the lamp is heated and expanded and passes thru the gypsum plug 11, causing the mercury column to rise, until after about 10 to 30 minutes it will reach the position as shown, thus short-circuiting the resistance 9. Since the control potential produced by the photoelectric cell at the grid of the tube 5 increases as the series resistance (2, 9) increases, as is understood, the sensitivity of the system is thus reduced and the apparatus adjusted to the sensitivity corresponding to turn on value $S_a$ according to Figures 1 and 2. If at night the illumination of the photoelectric cell 1 decreases, the grid of the tube being ordinarily negatively biased by means of the battery 3 becomes positive and the increasing anode current will cause the relay 6 to respond. As a result, the control circuit 7 will be closed, the contact 8 opened, and the incandescent lamp allowed to cool off whereby the gas is sucked back from the manometer tube 12 thru the plug 11 in such a manner that the mercury column begins to descend, thus removing the short circuit of the resistance after a certain elapse of time.

Thus the two resistances 2 and 9 are connected in series with the photoelectric cell and the system adjusted to a high sensitivity corresponding to the turn-off illumination value $S_m$. In the meantime, it has become completely dark and the relay 6 will remain in its attracted position until dawn and accordingly the artificial illumination remains connected throughout the night period.

The circuit as shown in Figure 4 operates in a similar manner as described, the only difference being the provision of a bi-metallic strip 13 acting as a delay switch. Preferably the bi-metallic strip is provided with a vane, such as a metallic vane 14, to increase its heat inertia to such an extent that the contact 15 is opened only after the lapse of about 10 to 30 minutes after closing of the contact 8. With the contact 15 closed, the resistance 16 is connected in parallel to the relay winding 6 so that the latter is relatively insensitive (corresponding response value $S_m$). During the daytime the contact 15 is in its open position. If at night the illumination of the photoelectric cell decreases, the armature of the relay 6 is attracted at a comparatively high daylight illumination (small anode current) and the control circuit 7 closed. At the same time contact 8 is opened so that the contact 15 will be closed about 10 to 20 minutes later. In the meantime it has become completely dark. Since now the relay 6, due to the resistance 16 connected in parallel therewith, has a lower sensitivity, its armature will be released the next morning at a lower illumination (response value $S_m$—higher anode current). A short time afterwards the contact 15 will again be opened.

A simple circuit arrangement according to the invention using a grid controlled thermionic gas discharge tube such as of the Thyratron type known in the art, is shown in Figure 5. The gas discharge tube 17 having the usual cathode anode and grid control electrodes is connected in series with a further tube 18 and the incandescent lamps 19 such as street lights, to be automatically connected and disconnected in accordance with the varying day light conditions. The tube 18 includes a bi-metallic strip 20 carrying a plate 21. The outside surface of the tube 18 is covered with a metallic coating 22 which, together with the plate 21, forms an electric condenser. If the bi-metallic strip 20 is heated, such as by the heater winding 21' as shown, it bends towards the right, thus decreasing the capacity of the condenser 21—22.

The grid of the gas discharge tube 17 is controlled by the photoelectric device 1 in accordance with the well known phase control method such as described in United States Patent 1,832,707. The alternating current operating potential for the photoelectric device and gas discharge tubes is supplied by a transformer 23, and a condenser 24 as shown placed in series with the photoelectric device with their junction point connected to the control grid and a suitable grid bias potential source such as winding 25' interposed in a known manner. The variable condenser 21—22 is connected in parallel to the condenser 24 as shown.

During the daytime the photoelectric cell is subjected to intense illumination in such a manner that the grid of the tube 17 becomes negative, and the current thru the tube is interrupted. Accordingly the bi-metallic strip 20 is in its straight position as shown and the condenser 21—22 has its highest capacity value. The latter corresponds to the critical turn-on value, corresponding to a low response sensitivity ($S_a$). After the daylight illumination has decreased at night the grid becomes more positive until when the critical illumination is reached a discharge is started thru the tube and the lamps 19 are turned on. At the same time current flows thru the winding 25 of the transformer 23 wound in the opposite sense to the main transformer winding thus reducing the potential of the photoelectric cell in such a manner that the discharge is maintained. Since the current applied in the lamps 19 flows thru the heating winding of the tube 18, the bi-metallic strip is heated and bent towards the right. After about 20 minutes the condenser 21—22 will have reached its minimum capacity whereby the circuit is adjusted to the critical sensitivity corresponding to turn-off ($S_m$) while it has become completely dark in the meantime.

On the next morning the critical grid potential necessary for the interruption of the discharge thru the tube 17 is reached at substantially lower illumination of the photoelectric cell (threshold $S_m$) as a result of the decreased capacity of the condenser 21—22. As soon as the discharge is interrupted, the counter winding 25 is deenergized and accordingly the potential of the photoelectric cell is increased in such a manner that the interruption of the discharge thru tube 17 is maintained with certainty. Consequently the bi-metallic strip begins to cool down, and since the cooling action takes place very slowly in the vacuum of tube 18 it will take about 30 minutes until the plate 21 has regained the position as shown in the drawings. In the meantime the illumination has increased to full daylight intensity and the circuit is ready for a renewed turn-on operation in the evening.

As is understood from the above, it is necessary for a safe and dependable operation of the circuits as described hereinbefore that the time constant of the time delay switch is substantially higher than the average duration of the dawn or twilight period. Thus it becomes necessary to adapt and adjust the time constant in each case dependent on the geographical latitude where the apparatus is being used. This however may be avoided by the use of the improved arrangements according to the invention as disclosed by Figures 6 and 9 whereby the delay period is dependent on the duration of the dawn and daylight periods, respectively.

Referring to Figure 6, we have again shown the photoelectric device 1 connected in series with a resistance 2 and supplied by a power source indicated by plus and minus signs. The junction point between the cell 1 and point 2 is connected to the grid of the electron tube 5 thru a choke coil 4, the latter serving in a known manner for the purpose of suppressing parasitic oscillations. Tube 5 is connected in series with resistance 26 and supplied from the same operating source as shown. The tube 5 and resistance 26 form a Wheatstone bridge circuit together with the resistances 27, 28, 29 wherein one of the diagonal bridge branches includes the power source and the other diagonal branch or bridge circuit includes a galvanometer or moving coil relay, as shown at 30. In this bridge arrangement the internal resistance of the tube 5 is balanced or unbalanced by either resistance 27, or to the combined resistances 27 and 28 in the series, depending on which of the contacts 31 or 32 in the bridge circuit is closed.

The galvanometer relay 30 serves to control the magnet coils 35 and 36 thru its contacts 33 and 34, the coils 35 and 36 being energized by a common source such as battery shown at 37. A T-shaped armature 38 is operated by the coils 35 and 36, and serves to control in turn the contacts 31 and 32. The armature 38 carries two nose-like projections 39 and 40, cooperating with a ratchet wheel shown at 41. The ratchet wheel 41 carries a nose 42 and is rotated thru frictional engagement with a driving wheel 43 in the direction as indicated by the arrow. The driving wheel 43 may be driven by any suitable prime mover such as clockwork or small synchronous motor or the like. The movement of the ratchet wheel 41 is halted whenever its nose 42 engages with either nose 44 or 45 associated with contacts 31 and 32 being in the open position at the then existing condition. The armature 38 may serve to operate a switch (not shown in the drawings for the sake of simplicity) for turning on and off the artificial lights or any other translating devices. In the position of the armature 38 as shown, the artificial lights are turned off while in the opposite position they are turned on, as will be understood.

During the daytime the photoelectric cell is exposed to intense illumination whereby the grid of the tube 5 is negatively biased by the biasing source 3 and accordingly the internal resistance of the tube has a very high value. As a result, the bridge circuit is unbalanced and a current flow established thru the relay galvanometer 30, causing a closing of the contact 34. The latter closes the circuit thru the coil 36, resulting in an attraction of the armature 38 into a position as shown in the drawings and closing of the contact 32. Since in this position the sum of the resistance 27—28 corresponds to the internal resistance of the tube, it follows that the current in the bridge circuit is reversed at grid potentials corresponding to comparatively high negative values; that is, a high illumination of the photoelectric device (threshold $S_a$).

Whenever at night the internal resistance of the tube 5 decreases, contact 33 is closed and a current established thru the coil 35. As a result, the lever 38 is moved to the left thus closing the contact 31 in such a manner that the tube resistance is unbalanced by the resistance 27. Accordingly the current of the bridge circuit is reversed, and the galvanometer 30 again closes contact 34 whereupon the magnet 36 tends to return armature 38 into the position shown in the drawings. However, armature and ratchet wheel are mutually locked as the nose 40 engages the ratchet 41. Only after the bridge current is again reversed; that is, when the illumination has decreased beyond the lower critical value ($S_m$) and accordingly the galvanometer relay has closed its contact 33 again energizing the coil 35, will the ratchet 41 be released by the nose 40 in such a manner that it may return slowly into the position as shown in the drawings by the driving force applied by the friction wheel 43. When the ratchet has reached the position as shown in the drawings, its nose 42 engages the nose 45, thus stopping its movement in this position.

In the morning the operation takes place in a reverse manner. When the illumination of the cell increases, at first contact 34 is closed and the lever 38 swung into the position shown in the drawings. Thus contact 31 will be opened and contact 32 closed, so that the bridge current is immediately reversed and the galvanometer closes again contact 33. As a result the magnet 35 is energized and tends to return the armature 38 towards the left but is prevented from doing so since the nose 39 engages in a tooth of the ratchet 41. This position is shown in Figure 6. Only after the illumination of the photoelectric cell has increased to such an extent that the current thru the galvanometer relays is again reversed; that is, contact 34 is again closed, will the magnet 36 swing the armature 38 to the right, thus again releasing the ratchet 41 which latter is then allowed to rotate until nose 42 engages with nose 44. In this position the arrangement is again ready for a renewed turn on operation in the evening.

In the arrangement as described above, the total delay is composed of two parts in that at first the initial switching position is maintained until the next following critical response limit has been passed—and then; that is, after the termination of the dawn or twilight periods, respectively,—the delay device 41 is started and serves to prepare the way for the reverse operation about 10–30 minutes later after the nose 42 has engaged either nose 44 or nose 45.

In the arrangements as described before, the anode current controlled by the photoelectric cell was used as a measure of the degree of brightness or illumination. In the following embodiments of the invention shown in Figures 7 to 11, the degree of brightness is measured or ascertained by the time period necessary for discharging an electrical condenser thru a photoelectric device serving as a discharge impedance. The condenser is connected to the grid of an electron tube and the current thru the tube blocked as long as the condenser charge is maintained. After the condenser has been discharged, the current flow thru the tube is started, causing the operation of the controlling relay. This method has the advantage of being substantially independent of the variations of characteristics of the tubes used and of the operating potentials, and furthermore makes it possible to use photoelectric cells of very low sensitivity but of greater stability and reliability and at lower costs.

The new principal of operation will be explained with reference to Figures 7 and 8. The grid of the electron tube 5 is connected to the positive pole of the high potential source thru the photoelectric device on the one hand and thru an electric condenser 46 on the other hand, as shown. For this purpose the condenser electrode 47 at the opposite side of the grid is connected thru a resistance 48 to a tap point 50 of a potentiometer 49 connected between the poles of the operating power source. Numeral 51 represents a switch for directly connecting the point 47 with the cathode of the tube 5.

Figure 8 is an explanatory diagram showing the grid potential of the tube if the switch 51 is temporarily opened for a short period. Normally the grid of the tube assumes a certain free potential (self-bias potential), ordinarily about two volts, whereby it absorbs an equal amount of ions from the anode current in such a manner that a strong anode current flows thru the tube resulting in an attraction of the relay armature 6. If now the contact 51 is opened at the instant $t_1$ the potential at the point 47 will increase according to the dotted curve $V_k$ to positive values since the condenser 46 is now connected to the point 50 of the potentiometer 49 thru the resistance 48. Due to the positive charge on the condenser electrode opposite the grid a corresponding negative charge is set up by electric induction on the opposite electrode of the condenser connected to the grid, as indicated by the plus and minus symbols in Figure 7. The necessary electrons for this negative charge will be absorbed by the grid from the space current thru the tube. During this phase the grid potential becomes temporarily more positive but immediately returns to its normal self-bias value. If then the switch 51 is again closed at the instant $t_2$ the point 47 will lose its positive charge leaking off to the cathode and the electrons trapped on the condenser electrode connected to the grid will return to the latter, thus charging it negatively as shown by the curve $V_g$ in Figure 8 at $t_2$. If the capacity of the condenser 46 is large as compared to the capacity of the grid, the charge applied to the grid is equal to the potential difference between the point 50 and the cathode of tube 5.

Consecutively the charge on the grid is discharged thru the photoelectric tube 1 which in the example shown is of the high vacuum type without a gaseous filling. During the discharge the discharging curve $V_g$ intersects the critical grid potential $V_r$ at the instant $t_3$ at which the relay 6 responds. Accordingly the armature of the relay 6 is released or repelled during the time period $t_2$—$t_3$ and this time period is inversely proportional to the amount of illumination incident upon the photoelectric tube.

Referring to Figure 9 which shows the apparatus embodying the above described principles of operation, the armature winding 52 corresponds to the relay 6 according to Figure 7 and the mercury switch 53 corresponds to the switch 51 shown in Figure 7. The armature of the relay 52 serves to move a head-piece 55 arranged at an angle to the armature and provided with a pair of grooves. The position of the head-piece 55 is periodically tested or ascertained by a feeling lever 65 whose extreme end is bent off as shown and engages with one of the grooves of the head-piece 55. The feeling lever 55 is pivoted about shaft 57 which also carries a mercury switch serving as the main control switch and having an output circuit connected at the terminals 7 as described in previous figures. We have furthermore shown two levers 59 and 60 mounted on the shaft 57 (see partial side view according to Figure 10) of which the former cooperates with a control disc 61 and the latter cooperates with a time delay disc 62. The control disc 61 carries a pair of pins 63 and 64 of different length as seen from Figure 10. The shorter pin 63, when engaging the hooked lever 53, lifts the mercury switch 53 temporarily, thus interrupting its contact. At the instant when the switch (corresponding to the switch 51 according to Figure 7) is again closed, the grid of the tube 5 is charged negatively in a manner described hereinbefore and subsequently starts to discharge thru the photoelectric tube (instant $t_2$). At the same time the armature 54 is released, assuming the position as shown in the drawings. After a certain time has elapsed, the pin 64 contacts with the guide piece 65 carried by the lever 59, thus pushing the lever to the right and then passes between the two guide pieces 56 and 66. As a result of this the feeling lever 56 is temporarily disengaged from the armature head 55 and will engage with a groove therein only in case that the armature has remained in its position; that is, if the illumination of the photoelectric cell has been too low to allow the grid condenser to discharge to a sufficiently low value beginning from the closing of the switch 53 and the return of the feeling lever 56 to cause a renewed attraction of the armature 54 (instant $t_3$).

The control disc 61 performs one revolution per minute so that a test is made every minute as to whether the illumination of the photoelectric cell is above or below a definite threshold value ($S_m$). The illumination to turn on and to turn off values in this case are determined by the angular distance between the pins 63 and 64, as is understood and may be adjusted by varying the position of the pin 63 such as by the arrangement of a number of holes as shown into which pin 63 may be screwed or plugged at any desired position. It is furthermore possible to vary the critical illumination by varying the charging potential supplied from the potentiometer 49 for which purpose we have shown in Figure 9 a step switch 67 by means of which the resistance 48 may be connected selectively at the tap point 50$a$, 50 or 50$b$.

Whenever the illumination of the photoelectric cell exceeds the critical value, the armature 54 is attracted. In this case the feeling lever 56, which is constructed resiliently in its lengthwise direction, follows the armature movement as long as it is not engaged with the armature head 55. If, however, the feeling lever in the manner described above is temporarily lifted it will no longer engage the groove in the armature head 55 but will glide along the armature heading in an upward direction by the action of the weight 68. As a result of this the lever 59 will move to the left in such a manner that the guide piece 56 is engaged by the pin 64 and pushed fully to the left. As soon as the pin 64 is again disengaged from the guide piece 66, the lever 59 again tends to move somewhat to the right by the action of the weight 68. In this case the feeling lever will engage the upper groove of the armature head 55 and the contact of the mercury 58 will be interrupted, resulting in a turning off of the artificial light corresponding to the positions of the system during the daytime.

At night time operation takes place in reversed manner but is governed in this case by the time period between the actuation of the mercury switch 53 by the pin 69 and the upward lift of the feeling lever 56 by the pin 64 engaging the guide piece 66. This second time period may be chosen by plugging the pin 69 into a suitable hole on the disc 61. Thus the position of the pin 63 governs the change-over to the position of the system during daytime. In order to indicate the prevailing condition, a celluloid disc 70 may be mounted upon the disc 61 having one half painted black and half white and corresponding to the two semi-circular rows of setting holes, as shown.

The delay action according to the invention is obtained in a similar manner as described before by the provision of the time delay disc 62 cooperating with the feeling lever 60. The delay disc 62 carries a pair of semi-circular ratchets 71 and 72 with a free slit-like space therebetween and is driven from the control disc 61 thru a friction wheel 75. The movement of the disc 62 is limited by the pin 73 engaging the bent-off end of the lever 60 (Figure 11). After the change-over, the bent down end of the lever 60 passes thru the slit of the ratchet 71 and 72 and the disc 61 is thus released and started to rotate. After the lever has passed thru the slit, the change-over of the sensitivity is effected in the manner as described before, such for instance as in Figure 7, and there is a tendency to the back switching movement. Accordingly, the feeling lever 56 may engage neither in the upper nor lower groove of the head piece 55 so that the turned-down end of the lever 60 engages with either ratchet wheel 71 and 72 in such a manner that neither a back switching operation nor a further rotation of the delay disc is possible. This transitory period ceases as soon as the following critical value of the illumination passes and the feeling lever is definitely engaged with the upper or lower groove of the head piece 55. Then the delay disc is released and allowed to rotate for about 20 minutes, until the pin 74 again engages the bent-off end of the lever 60.

Thus it is seen that the basic operation of the apparatus as described by Figures 7–11 corresponds to the operation disclosed by Figure 6, the change-over from one critical sensitivity to another taking place immediately with each switching operation and at the same time applying a blocking device serving to prevent back switching operations. Only after the next following critical illumination has been passed the delay dial will be started and after a period of about 10 to 30 minutes restore the position for the next switching operation.

While we have described the invention in connection with the specific embodiments as shown in the drawings it is undestood that the novel underlying idea and principle of the invention is susceptible to various modifications and variations coming within its broadest scope and spirit as expressed in the ensuing claims.

We claim:

1. A control system comprising a photoelectric device and a relay controlled by the output of said device, a translating device controlled by said relay, means for connecting and disconnecting said translating device upon decrease of the illumination incident upon said photoelectric device below a predetermined upper critical value and upon increase of the illumination incident upon said photoelectric device beyond a predetermined lower critical value respectively, said means comprising sensitivity adjusting means for said control system, and delayed action means being normally at rest and arranged to become effective with each actuation of said relay to control said sensitivity adjusting means after lapse of a predetermined time period, to change over the response sensitivity of said control system from a lower to a higher value and conversely subsequently to each connection and disconnection, respectively, of said translating device.

2. An illumination switching system comprising a photoelectric control circuit including a photoelectric device and a relay controlled by the output of said device, an artificial illumination circuit controlled by said relay, means for automatically turning on and off the artificial illumination by said photoelectric device upon decrease of the daylight illumination incident upon said photoelectric device below a predetermined relatively high critical value and upon increase of the daylight illumination incident upon said photoelectric device beyond a predetermined relatively low critical value, respectively, said means comprising sensitivity adjusting means for said control circuit, and delayed action means being normally at rest and arranged to become effective with each actuation of said relay to control said sensitivity adjusting means after lapse of a predetermined time period, to change over the response sensitivity of said control circuit from a lower to a higher value and conversely subsequently to each opening and closing, respectively, of said illumination circuit.

3. In a switching device as claimed in claim 2 including an electron tube, a condenser connected to the grid of said tube, means for periodically applying and removing a positive charge to the condenser electrode opposite the grid of said tube and consecutively allowing the thus produced negative charge on the grid to discharge thru said photoelectric device to ascertain the existing value of the incident daylight illumination by the varying discharge periods to determine and utilize the varying discharge periods as a means for controlling the actuation of said relay.

4. In a switching system as claimed in claim 2 including a grid controlled gas discharge tube operated by alternating current anode and grid biasing potentials and controlled by said photoelectric device and inserted in said control circuit, a grid condenser for said tube to determine the phase of the grid potential and to control the starting of the discharge thru said tube, means for changing over the capacity of said grid condenser by said delay device from one value to another and vise versa subsequent to each actuation of said relay and further means for varying the grid bias of said tube to maintain the discharge and interrupting condition after each respective response of the tube.

5. In a system as claimed in claim 2 wherein said time controlled means is comprised of a heat responsive element, means for heating said element during one operating position of said relay and for allowing said element to cool during the other operating position of said relay, said element having a contact controlling said sensitivity adjusting means.

6. An illumination switching system comprising a photoelectric control circuit including a photoelectric device and a relay controlled by the output of said device, an artificial illumination circuit controlled by said relay, means for automatically turning on and off the artificial illumination by said photoelectric device upon decrease of the daylight illumination incident upon said photoelectric device below a predetermined relatively high critical value and upon increase of the daylight illumination incident upon said photoelectric device beyond a predetermined relatively low critical value, respectively, said means comprising sensitivity adjusting means for said control circuit arranged to be controlled with each actuation of said relay to change over the response sensitivity of said control circuit from a lower to a higher value and conversely upon turning on and off, respectively, of the artificial illumination by said relay, blocking means to prevent actuation of said relay upon each turning on and off of the artificial illumination, and time controlled means normally at rest and arranged to be set into motion upon passing of the daylight illumination through the other critical value subsequently to each actuation of said relay, said time controlled means being further adapted to unlock said blocking means after lapse of a predetermined time period.

7. In a system as claimed in claim 2, a resistance in series with said photoelectric device, an electron valve having a cathode, anode and a grid, means to control said grid according to potential variations developed at the junction between said photoelectric device and said resistance, said relay being connected in the anode circuit of said valve, and said sensitivity adjusting means controlling said resistance between an upper and lower value.

8. In a system as claimed in claim 2 wherein said sensitivity adjusting means consists of a shunt impedance for said relay arranged to be connected and disconnected subsequently to each opening and closing of said illumination circuit.

HEINRICH GEFFCKEN.
HANS RICHTER.